United States Patent
Leoniak

(10) Patent No.: US 7,290,712 B2
(45) Date of Patent: Nov. 6, 2007

(54) METHOD AND APPARATUS FOR DISPLAYING DIGITAL CONTENT WITH INTEGRATED OPTICAL SENSOR FOR TRIGGERING SECONDARY DISPLAY

(76) Inventor: Michael Stefan Leoniak, 123 Progress St., Lincoln, RI (US) 02865

( * ) Notice: Subject to any disclaimer, the term of this patent is extended or adjusted under 35 U.S.C. 154(b) by 503 days.

(21) Appl. No.: 10/776,066

(22) Filed: Feb. 11, 2004

(65) Prior Publication Data

US 2004/0155990 A1    Aug. 12, 2004

Related U.S. Application Data

(60) Provisional application No. 60/446,635, filed on Feb. 11, 2003.

(51) Int. Cl.
*G03B 7/08* (2006.01)
(52) U.S. Cl. .............................. 235/462.24; 235/462.01
(58) Field of Classification Search ................................. 235/462.01–462.49, 472.01, 47
See application file for complete search history.

(56) References Cited

U.S. PATENT DOCUMENTS

| | | | |
|---|---|---|---|
| 4,769,292 A | | 9/1988 | Tang et al. |
| 5,414,251 A | * | 5/1995 | Durbin ..................... 235/462.2 |
| 5,659,167 A | * | 8/1997 | Wang et al. ............ 235/472.01 |
| 5,793,031 A | * | 8/1998 | Tani et al. ............. 235/462.15 |
| 5,821,523 A | * | 10/1998 | Bunte et al. ........... 235/472.01 |
| 5,945,661 A | * | 8/1999 | Nukui et al. ........... 235/462.45 |
| 6,084,526 A | | 7/2000 | Blotky et al. |
| 6,211,613 B1 | | 4/2001 | May |
| 6,337,836 B1 | | 1/2002 | Eidelson |
| 6,395,328 B1 | | 5/2002 | May |
| 6,445,450 B1 | | 9/2002 | Matsumoto |
| 6,637,662 B2 | * | 10/2003 | Itou et al. .............. 235/472.01 |
| 6,641,046 B2 | * | 11/2003 | Durbin .................. 235/472.01 |
| 6,667,791 B2 | | 12/2003 | Sanford et al. |
| 6,679,421 B2 | * | 1/2004 | Shin et al. ................... 235/375 |
| 6,726,094 B1 | | 4/2004 | Rantze et al. |
| 6,969,002 B2 | * | 11/2005 | Creamer et al. ....... 235/462.15 |
| 6,997,384 B2 | * | 2/2006 | Hara ......................... 235/454 |
| 7,080,786 B2 | * | 7/2006 | Longacre et al. ...... 235/462.01 |
| 7,111,787 B2 | * | 9/2006 | Ehrhart .................. 235/472.01 |

* cited by examiner

Primary Examiner—Daniel Stcyr
(74) Attorney, Agent, or Firm—Christensen O'Connor Johnson Kindness PLLC

(57) ABSTRACT

An electronic screen display includes a screen, a memory storing digital content for display on the screen, a processor communicatively coupled to the memory and the screen, and a sensor communicatively coupled to the processor. The processor obtains digital content from the memory and generates signals causing a primary display to appear on the screen. The sensor is activated by sensing a light signal emitted from an external device being used to read information from the primary display, and causes the processor to obtain further digital content from the memory and generate signals causing a secondary display to appear on the screen. A corresponding display method includes displaying primary digital content on a screen, sensing a light signal emitted from an external device being used to read information from the screen, and in response to the sensing the light signal, causing secondary digital content to appear on the screen.

25 Claims, 4 Drawing Sheets

METHOD AND APPARATUS FOR DISPLAYING DIGITAL CONTENT WITH INTEGRATED OPTICAL SENSOR FOR TRIGGERING SECONDARY DISPLAY

CROSS-REFERENCE TO RELATED APPLICATION

This application claims the benefit of U.S. Provisional Patent Application No. 60/446,635, filed Feb. 11, 2003, the entire disclosure of which is incorporated herein by reference.

FIELD OF THE INVENTION

The present invention relates to displays using thin electronic screen technology to display digital content.

BACKGROUND OF THE INVENTION

Thin electronic screen technologies are known in the art and include liquid crystal displays (LCDs), organic light emitting diodes (OLEDs), light emitting polymers (LEPs), polymer light emitting displays (PLEDs), and electroluminescent displays (ELDs). Many of these technologies can be implemented on flexible substrates with electronic processors or controllers that produce a display of digital content.

In another technology area, symbologies are used to provide coded forms of data that can be delivered to a computer system using a "reader." Common symbologies include barcodes and coded icons. Readers typically come in one of four formats: pen readers or wands, laser scanners, CCD scanners, or camera-based readers. A reader scans or otherwise acquires an image of a symbol and reflects information back into the reader in a variety of forms based on the type of reader used. This information is then decoded and sent to a computer system for a variety of uses. These uses range widely from industry to industry. Three exemplary uses include (but are not limited to): labeling of a product, tracking of goods or services, and inventory control.

Barcodes, coded icons, and other types of symbologies are typically printed on a paper or plastic substrate. The substrate could be the product itself (as in Direct Part Marking or DPM), packaging for the product, or peripheral product materials, such as instructions or labels associated with the product. Symbologies can represent many types of information including for example, numerals (0-9), letters (A-Z), special characters (space, −+.$/%), ASCII characters, check digits, error correction codes, etc. Furthermore, readable symbologies can be printed using various printing technologies, including inkjet printers, commercial multicolor press printers, thermal printers, laser printers, and embossing.

Basic symbologies include one-dimensional numeric, alphanumeric, and two-dimensional symbologies. New types of coded icons have also been created. For instance, a three-dimensional barcode can be embossed on a surface and read with a "reader" that reads in three dimensions, including the "z" (depth) dimension, to obtain the coded data. Another type of coded icon, called a data glyph, is comprised of a series of printed slash marks that can be formed into or hidden behind a logo. More specific types of symbologies that are currently used include: Interleaved 2/5, Industrial 2/5, Matrix 2/5, Datalogic 2/5, Airline 2/5, CODABAR, Code 39, Code 32, Code 93, Code 128, UCC 128, UPC-A, UPC-E, EAN-13, EAN-8, Addon-2, Addon-5, PDF417, Data Matrix, Bumpy Barcode (3-d barcode), ArrayTag, Datastrip Code, MaxiCode, SmartCode, QR Code and Snowflake Code.

A symbol, such as a barcode or a coded icon, carries data that is interpreted by a light-emitting scanning device that "reads" the symbol, decodes it as necessary, and sends the decoded data to a computer system for use within that system. Symbologies are extremely valuable to and are pervasively used in almost every industry. At the present time, symbologies provide static symbols that occupy a certain amount of space on a product or on packaging or peripheral materials related to the product, depending on the symbol standards and the specific industry of the product. However, space on a given product, product package, or peripheral materials associated with a product is typically at a premium and is often used carefully and strategically. What is needed is an apparatus and method for displaying information, such as a coded symbology, that can provide alternate displays of information using the same space.

SUMMARY OF THE INVENTION

The present invention addresses the foregoing need and other shortcomings that exist in current technologies. Embodiments of the present invention may be used to electronically display a symbol, such as a barcode or coded icon, on a thin electronic display and use the method of "reading" the barcode or coded icon on such a display to activate an integrated light-dependent sensor. In a preferred embodiment, the light-dependent sensor is activated by specific light for which the sensor has been calibrated. The sensor is not activated by general ambient light, but by light emitted from a "reader." In turn, the light-dependent sensor acts as a switch that, when activated, initiates a change in the electronic display. The barcode or coded icon on the display may be replaced with additional information or images, or new information or images can be added to the barcode or coded icon on the display. Other such images may include, for example, static or dynamic images (i.e., still or moving images). The information displayed on the electronic display could have a variety of functions, from entertainment to advertising to reporting critical data related to the product, like expiration dates.

The barcode or coded icon may occupy a small portion of the electronic display, or alternatively fill the entire area of the electronic display, depending upon the size of the display. Electronic displays provided in accordance with the present invention provide added value to consumers, manufacturers, distributors or other users by utilizing an area, normally reserved for static barcodes or coded icons, as a dual or multi-purpose electronic display space. Initially, the electronic display carries data such as a symbology (barcode or coded icon). After the data of the symbology has been read from the digital display using a light-emitting reader, the display can be used for alternate purposes, including but not limited to the purposes described above.

Accordingly, an electronic screen display of the present invention may include a screen; a memory storing digital content for display on the screen; a processor communicatively coupled to the memory and the screen, wherein the processor is configured to obtain digital content from the memory and generate signals causing a primary display to appear on the screen; and a sensor communicatively coupled to the processor such that, when activated by sensing a light signal emitted from an external device being used to read information from the primary display on the screen, the sensor causes the processor to obtain further digital content from the memory and generate signals causing a secondary display to appear on the screen.

Another electronic screen display may include a screen; a memory storing a symbology for display on the screen; a processor communicatively coupled to the memory and the screen, in which the processor is configured to generate signals causing the symbology stored in the memory to appear on the screen, and wherein the symbology is translatable into a computer-readable identification of a product for automating a purchase of the product.

A method performed in accordance with the present invention may include displaying primary digital content on a screen; sensing a light signal emitted from an external device being used to read information from the screen; and in response to the sensing the light signal, causing secondary digital content to appear on the screen.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The following description provides several exemplary embodiments of the invention, including preferred embodiments, to illustrate ways in which the present invention can be implemented. While many advantages and features are evident from these disclosed embodiments, it will be appreciated that the invention can be implemented in yet further alternative embodiments and still achieve the features and advantages of the invention. Accordingly, the invention is not limited to the precise forms disclosed herein.

Figure 1:
FIG. 1 is an illustration showing an example of a barcode.
Figure 2:
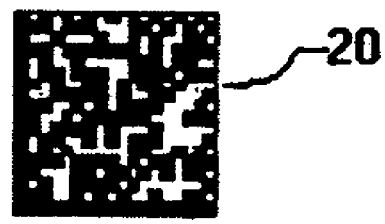
FIG. 2 is an illustration showing an example of a two-dimensional coded icon.

Embodiments of the present invention, in one aspect, provide electronic displays that may be used on products, product packaging, or peripheral material for products. These electronic displays are suited for displaying digital content, such as a barcode 10 or a coded icon 20 as shown in FIGS. 1 and 2, in place of static printed barcodes or coded icons. If desired, the electronic displays may be implemented on flexible substrates to produce pliant electronic displays.

In another aspect, an electronic display constructed according to the invention includes an integrated light-sensitive sensor that is preferably calibrated to detect only certain light emitted from readers. The sensor may be calibrated to activate when light having a certain wavelength or pattern is received by the sensor. Such light emitted from a reader may or may not be in the range of wavelengths visible to the human eye. After information such as a digital barcode or coded icon is "read" from the display by a reader, the electronic display presents other information or images on the display utilizing the space previously occupied by the barcode 10 or coded icon 20.

Figure 3:
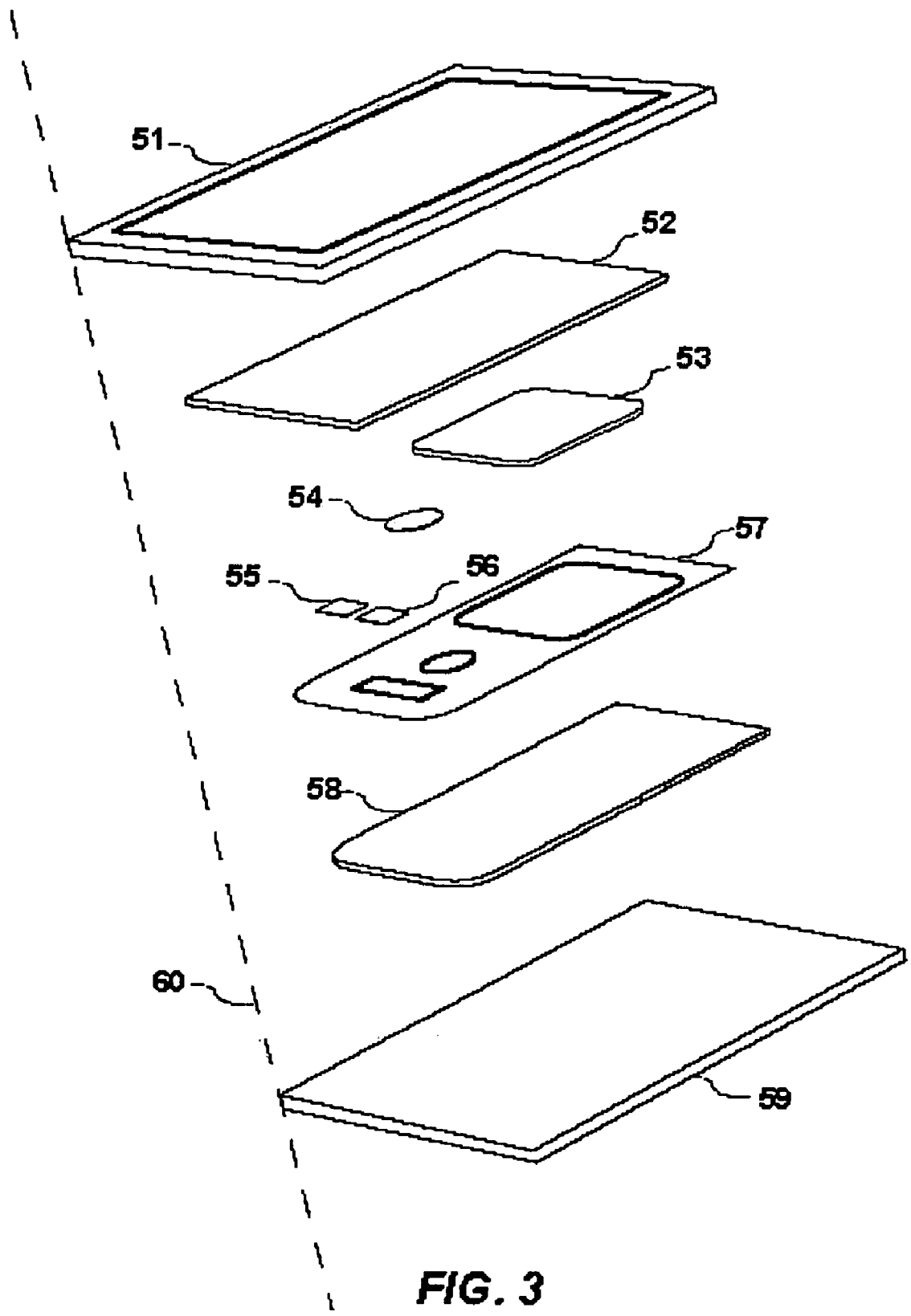
FIG. 3 is an illustration showing an exploded assembly for one exemplary embodiment of a display having an integrated optical sensor constructed in accordance with the present invention.

FIG. 3 illustrates an exploded view of parts that can be assembled to form an electronic screen display 60 in accordance with one embodiment of the invention. The electronic screen display is comprised of layers and components that include a screen 52, a light-sensitive sensor 54, a processor 55, a memory 56, a battery 53, and a flexible circuit 57 with driver circuitry (if needed) to communicate electrical signals for the screen 52. These parts are shown separately in FIG. 3 for ease of illustration, but in other embodiments, one or more of the parts may be integrated to form fewer component parts. Additional component parts may also be added as needed in other embodiments of the electronic screen display 60.

The electronic screen display 60 is a multilayered assembly that, when manufactured, preferably creates a slim and self-contained unit. The screen 52 may be manufactured on a thin, flexible substrate using OLED, LEP, PLEDS, ELD or flexible LCD screen technology. Suitable OLED screens, for example, are currently available from Eastman Kodak, and LEP screens are available from Cambridge Display Technology located in the UK. Under the control of the processor 55, the screen 52 becomes the medium that initially displays primary digital content, such as a digital barcode or a coded icon, and later displays secondary content when the barcode or coded icon is read by a reader.

In this embodiment, the screen 52 is positioned above a light-sensitive sensor 54 that may be formed using, for example, a light-dependent resistor (LDR), a photocell or a charge coupled device (CCD). The sensor 54 operates as a light-activated switch. Suitable sensors include, for example, VT series photocells from Perk Elmer and 9P series photocells from Sellco Products.

The process of delivering secondary content to the screen 52 is managed by the processor 55. When the sensor 54 detects light for which it is calibrated, the sensor 54 sends a signal to the processor 55 to indicate activation of the sensor. The processor 55, in turn, removes the digital barcode or coded icon from the screen 52, reads secondary digital content from the memory 56, and sends signals to the screen 52 to display the secondary digital content. A suitable processor available from Maxim is sold under the model number ICM7212AMIPL-ND, and a suitable memory is available from Atmen under the model number AT25F512N-10SI2.7-ND, as provided by Digi-Key Corporation.

A flexible circuit 57 is used to secure in place and communicatively link the processor 55, memory 56, battery 53 and the sensor 54. Polymer thick film technology from Parlex Corporation, for example, may be used to produce the flexible circuitry 57. Power required by the component parts of the electronic screen display 60 is drawn from the battery 53 which preferably has a slim profile. Suitable printed polymer batteries are available from Powerpaper Ltd., and lithium polymer batteries are available from Sanyo. Other batteries may also be used. The battery 53 is connected to leads that extend from the flexible circuit 57. A protective shielding membrane 58 under the circuit 57 may be included in the electronic screen display 60 as needed.

Figure 4:
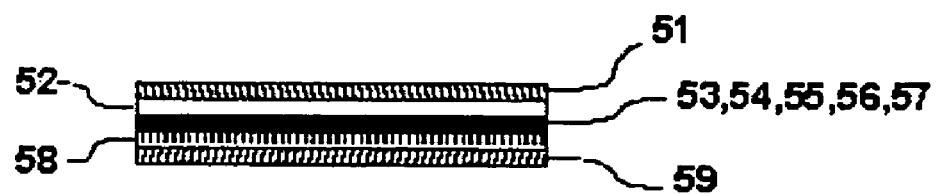
FIG. 4 is a side view of an assembled display using the component parts illustrated in FIG. 3.

The two outermost layers 51 and 59 are membranes that contain the components of the electronic screen display 60 and may be used as needed to protect the component parts of the electronic screen display. Preferably, the membranes 51 and 59 are pliable and easy to work with, while capable of delivering needed protection to the internal components. As illustrated in FIG. 4, the top outer layer 51 covers the screen 52. The top outer layer 51 may be formed of a die cut opaque substrate or could be clear material that completely seals in the screen 52. The bottom layer 59 is a membrane that may have the same make up as the top layer or may provide a solid backing for the electronic screen display 60.

Figure 5:
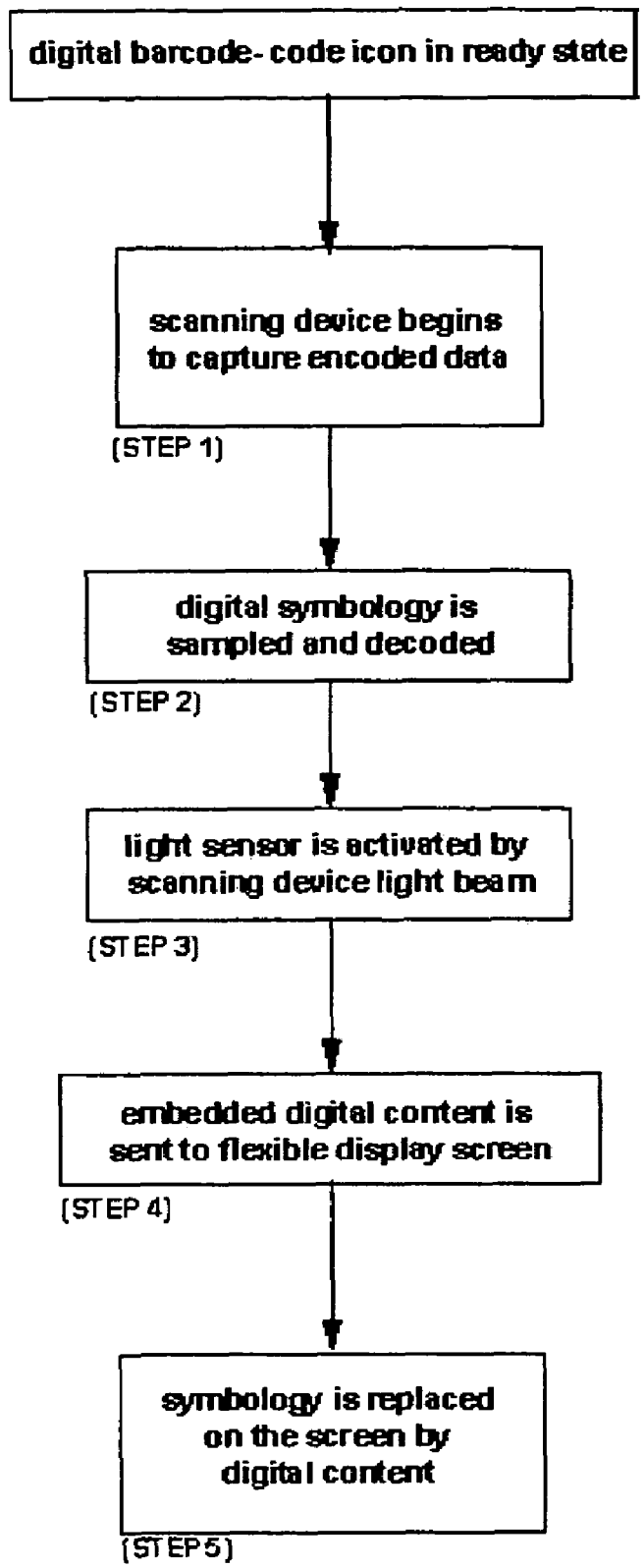
FIG. 5 is a flow diagram describing a display method provided in accordance with one embodiment of the present invention.

As can be observed from the foregoing embodiment, a flexible screen 52 displaying primary content is combined with an integrated light sensitive sensor 54 that acts as a digital switch and prompts the delivery of secondary digital content to the screen when activated by certain light. FIG. 5 is a flow diagram describing a method for displaying digital content on a screen in accordance with one embodiment of the invention. While in an initial "ready" state, the processor 55 provides the screen 52 with primary digital content, such as a barcode 10 or coded icon 20, for display. As indicated at "STEP 1" in FIG. 5, an external scanning device or reader emits a light beam and begins to capture the encoded data in the displayed barcode or coded icon. At "STEP 2", the digital symbology on the display is sampled and decoded. The light beam emitted from the scanning device is detected by the light-sensitive sensor 54 disposed behind the screen 52, which activates the sensor, as indicated at "STEP 3". An electrical signal from the activated sensor causes the processor 55 to obtain secondary digital content stored in the memory 56, as indicated at "STEP 4" and send the secondary content to the flexible screen 52 for display. At "STEP 5", the digital symbology previously displayed on the screen 52 is replaced by the secondary digital content. Although certain actions are identified as "STEPS" in the foregoing description, persons having ordinary skill in the art will recognize that one or more of the actions may be performed in a different order than described or may be performed simultaneously.

Figure 6:
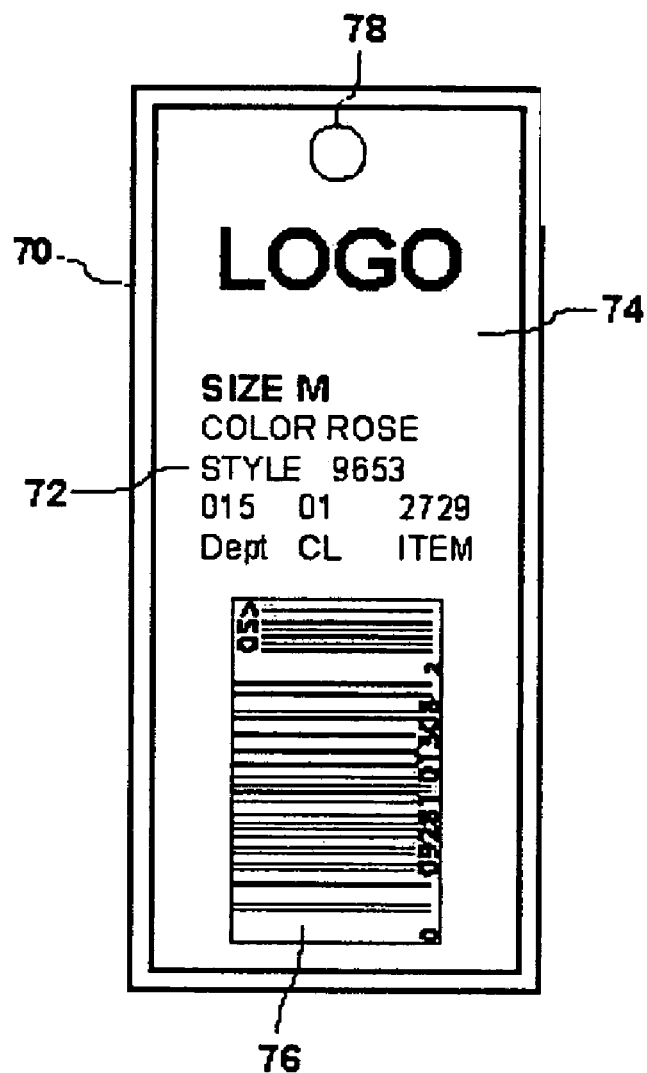
FIG. 6 is a pictorial view of a hang tag incorporating a display as provided in FIG. 3.

One type of product that can incorporate the present invention is briefly described in connection with FIG. 6 which depicts a paper hang tag 70 for use with a clothing product. In this exemplary embodiment, the hang tag 70 is formed of two layers of paper bonded together with text 72 and/or graphics 74 printed on the outside. One or both of the paper layers has a die-cut hole through which an electronic screen display 76, e.g., assembled from the parts shown in FIG. 3, can be viewed. The electronic screen display 76 is thus embedded in the paper hang tag 70 and is encoded with an appropriate barcode or coded icon that identifies the product for which the hang tag is designed. Secondary information that a retailer may wish to have displayed on the electronic screen display may also be stored in the memory 56 at this time. A hole 78 may be defined in the hang tag 70 to facilitate affixation of the tag to the clothing product.

The tags are shipped to the store and the retailer applies the tags to the clothing products. Before purchase, the tags look very much like traditional tags in that they carry all the necessary information including the symbology (barcode or coded icon), they have a paper component to them, and they are hung from an article of clothing. Upon purchase however, when the barcode or coded icon is scanned, the sensor 54 is activated and causes the processor 55 to interact with the memory 56 and the screen 52 to display secondary information.

A clock function may be programmed into the processor 55 so that the primary display of the barcode or coded icon appears on the screen 52 after a predetermined amount of time. The time delay may be selected in accordance with expected shipping time for the tags to reach the retailer. The clock function may also be used to delay the display of the secondary information after the barcode (or coded icon) has been scanned and the sensor 54 activated. If desired, the processor 55 may be further configured to return the primary display (e.g., the barcode or coded icon) to the screen 52 after concluding the display of the secondary information (e.g., after some time that the secondary information has been displayed). In other embodiments, the hang tag 70 may be mostly or entirely comprised of the electronic screen display 76.

Electronic screen displays constructed according to the invention may be implemented in many ways in products, product packaging, or peripheral materials associated with a product, an example of which is the hang tag described above. Additional ways to apply the electronic screen display to a product include adhesives, snaps, pins, pockets, etc., where the electronic screen display itself becomes a label.

With little or no modification the invention could also be used in a wide variety of other products, product packaging or peripheral materials where printed barcodes or coded icons, or other types of information, are presented. From the foregoing description, one skilled in the art may envision various uses and applications of the present invention. These various applications or modifications are intended to be included in the present invention and its scope as defined by the following claims.

The embodiments of the invention in which an exclusive property or privilege is claimed are defined as follows:

1. An electronic screen display, comprising:
    a screen;
    a memory storing digital content for display on the screen;
    a processor communicatively coupled to the memory and the screen, wherein the processor is configured to obtain digital content from the memory and to generate an action causing a primary display to appear on the screen; and
    a sensor communicatively coupled to the processor, wherein the sensor is configured to activate only when detecting a certain light signal emitted from an external device, the light signal being used by the external device to read or assist in reading information from the primary display on the screen, and wherein, when activated by the light signal, the sensor is triggered to cause the processor to obtain further digital content from the memory and to generate an action causing a secondary display to appear on the screen.

2. The electronic screen display of claim 1, wherein the screen is a thin, flexible screen comprised of light emitting diodes, liquid crystal display, a light emitting polymer material, or an electroluminescent display.

3. The electronic screen display of claim 1, wherein the sensor is comprised of a light-dependent resistor.

4. The electronic screen display of claim 1, wherein the sensor is comprised of a photocell.

5. The electronic screen display of claim 1, wherein the sensor is comprised of a charge coupled device.

6. The electronic screen display of claim 1, wherein the sensor is configured to activate only when sensing a predefined light signal.

7. The electronic screen display of claim 6, wherein the light signal is defined by wavelength.

8. The electronic screen display of claim 6, wherein the light signal is defined by a pattern.

9. The electronic screen display of claim 1, wherein the sensor is disposed underneath the screen.

10. The electronic screen display of claim 1, wherein the processor is further configured with a clock function that causes a timed appearance of the primary display.

11. The electronic screen display of claim 1, wherein the processor is further configured with a clock function that causes a timed appearance of the secondary display.

12. The electronic screen display of claim 11, wherein the timing of the timed appearance is measured from activation of the sensor.

13. The electronic screen display of claim 11, wherein further timing causes the primary display to reappear on the screen after concluding the timed appearance of the secondary display.

14. A method for display of primary and secondary digital content on a screen, comprising:
- displaying primary digital content on a screen;
- sensing a light signal emitted from an external device that is being used to read or assist in reading information from the primary digital content displayed on the screen, wherein the light signal is generated by the external device; and
- in response to the sensing the light signal, causing secondary digital content to appear on the screen.

15. The method of claim 14, wherein the primary digital content is a barcode or coded icon.

16. The method of claim 14, wherein the secondary digital content replaces the primary digital content on the screen.

17. The method of claim 14, wherein the secondary digital content is added to the primary digital content on the screen.

18. The method of claim 14, wherein the primary digital content returns to display on the screen after concluding the display of the secondary digital content.

19. The method of claim 18, wherein concluding the display of the secondary digital content is timed.

20. The method of claim 14, wherein the secondary digital content appears after a timed delay from sensing the emitted light signal.

21. The method of claim 14, wherein the sensed light signal that causes the secondary digital content to appear on the screen is a predefined light signal.

22. The method of claim 21, wherein the light signal is defined by wavelength or pattern.

23. An electronic screen display system, comprising:
- a screen;
- a memory storing digital content for display on the screen;
- a processor communicatively coupled to the memory and the screen, wherein the processor is configured to obtain digital content from the memory and to generate an action causing a primary display to appear on the screen;
- an external light-emitting device configured to generate and emit a light signal that is directed toward the screen to read or assist in reading information from the primary display on the screen; and
- a sensor communicatively coupled to the processor, wherein the sensor is configured to activate when the sensor detects the emission of the light signal from the external light-emitting device,
- wherein the sensor, when activated by the light signal, is triggered to cause the processor to obtain further digital content from the memory and to generate an action causing a secondary display to appear on the screen.

24. The electronic screen display system of claim 23, wherein the primary display on the screen includes a symbology that is readable from the screen by the external light-emitting device and translatable into an identification of a product for automating a purchase of the product.

25. The electronic screen display system of claim 23, wherein detection of light emission from the external device by the sensor indicates a purchase of the product which causes the secondary display to appear on the screen.

* * * * *